US010887362B2

(12) United States Patent
Vikramaratne

(10) Patent No.: US 10,887,362 B2
(45) Date of Patent: Jan. 5, 2021

(54) FORENSIC WATERMARKING OF SHARED VIDEO CONTENT

(71) Applicant: Box, Inc., Redwood City, CA (US)

(72) Inventor: Victor De Vansa Vikramaratne, Mountain View, CA (US)

(73) Assignee: Box, Inc., Redwood City, CA (US)

( * ) Notice: Subject to any disclaimer, the term of this patent is extended or adjusted under 35 U.S.C. 154(b) by 264 days.

(21) Appl. No.: 15/483,998

(22) Filed: Apr. 10, 2017

(65) Prior Publication Data

US 2018/0295172 A1   Oct. 11, 2018

(51) Int. Cl.
*H04L 29/06* (2006.01)
*H04N 21/8358* (2011.01)
*H04N 21/845* (2011.01)

(52) U.S. Cl.
CPC ........ *H04L 65/602* (2013.01); *H04L 65/4069* (2013.01); *H04L 65/607* (2013.01); *H04N 21/8358* (2013.01); *H04N 21/8456* (2013.01)

(58) Field of Classification Search
CPC . H04L 65/4069; H04L 65/602; H04L 65/607; H04N 21/8358
See application file for complete search history.

(56) References Cited

U.S. PATENT DOCUMENTS 6,961,444 B2   11/2005 Levy
7,197,164 B2   3/2007 Levy
8,407,287 B2   3/2013 Wiener et al.
8,775,811 B2 *  7/2014 Marking .............. H04N 7/1675
                                                       711/163
9,100,654 B2   8/2015 Kim et al.
(Continued)

FOREIGN PATENT DOCUMENTS

CN   102724554 B   6/2014
GB     2505657 A * 3/2014 ............. H04N 19/46

OTHER PUBLICATIONS

Zhu, Ye, et al. "Correlation-based traffic analysis attacks on anonymity networks." IEEE Transactions on Parallel and Distributed Systems 21.7 (2010): 954-967.
(Continued)

*Primary Examiner* — Gil H. Lee
(74) *Attorney, Agent, or Firm* — Vista IP Law Group, LLP

(57) ABSTRACT

Systems for identifying misappropriation of forensically-watermarked video content. A method embodiment for forensic watermarking commences upon identifying video sources. A video is partitioned into frame ranges or "chunks". Different watermarking schemes are applied to the chunks to generate different watermarked versions of each chunk. Upon receiving a request from a user to view a requested video, a digital signature is generated from a set of request attributes such as a user ID or session ID. A video stream is assembled wherein the stream chunk order comprises a particular recoverable sequence of the differing watermarked chunks, where the sequence is based on bit sequences of the digital signature. A misappropriated video or portion thereof can be analyzed to identify the particular recoverable sequence or portion thereof. Based on the recoverable sequence, the digital signature can be recovered, and based on the digital signature, the source of the misappropriation can be determined.

22 Claims, 11 Drawing Sheets

(56) References Cited

U.S. PATENT DOCUMENTS

| | | | |
|---|---|---|---|
| 2003/0081779 A1* | 5/2003 | Ogino | H04N 21/23892 380/207 |
| 2004/0098593 A1* | 5/2004 | Muratani | G06T 1/005 713/176 |
| 2012/0089843 A1* | 4/2012 | Kato | G06F 21/10 713/176 |
| 2012/0308071 A1* | 12/2012 | Ramsdell | H04N 1/32144 382/100 |
| 2014/0099023 A1* | 4/2014 | Lo | G06F 16/785 382/165 |
| 2015/0180873 A1* | 6/2015 | Mooij | H04N 21/2585 726/4 |
| 2017/0099149 A1* | 4/2017 | Eber | H04L 67/06 |
| 2017/0118537 A1* | 4/2017 | Stransky-Heilkron | G06F 21/16 |

OTHER PUBLICATIONS

"Can Real-time Video Watermarking Take a Bite Out of Piracy?", http://www.popularmechanics.com/technology/a20201/safestream-real-time-video-watermarking/, Mar. 31, 2016.

* cited by examiner

FORENSIC WATERMARKING OF SHARED VIDEO CONTENT

FIELD

This disclosure relates to managing content in a cloud-based service platform, and more particularly to techniques for forensic watermarking of shared video content.

BACKGROUND

Cloud-based shared content storage systems have impacted the way people and corporations store their electronically stored information objects (e.g., files, images, videos, etc.). The availability of cloud-based shared content storage systems has also impacted the way such personal and corporate content is shared. One benefit of using such cloud-based systems is the ability to share secure content (e.g., copyright protected videos, etc.) without the need for delivering non-transitory copies of the content to each of the unique users (e.g., viewers) in the audience. Some shared content services and platforms facilitate on-demand replay of pre-recorded videos and/or live streaming/viewing of live video broadcasts (e.g., pay-per-view videos, etc.). Cloud-based platforms implement various techniques to securely share large volumes of content with authorized viewers on a variety of local user devices, such as mobile phones, tablets, laptop computers, desktop computers, and/or other devices. For example, one such technique partitions a given video streamed from cloud-based storage to a user device into "chunks" to improve the user experience (e.g., by reducing viewing delay or lag, etc.).

In some cases, however, such secure content can be disclosed (e.g., leaked, whether by accident or with malicious intent) by means of an unmonitored sharing of the object being viewed. For example, some or all of a protected video playing on a user device might be captured on a separate device (e.g., hand-held mobile device camera) and disclosed to various third parties (e.g., unauthorized parties). In some cases, the disclosed (e.g., pirated) video or portions of the video can undergo multiple video re-encodings during the disclosure or distribution process. In some cases, the captured content might be later discovered, and often in such cases, the content owners might want to determine the source (e.g., perpetrating distributor) of the unauthorized disclosure.

Unfortunately, discovery of the source of a disclosed video in a highly active multi-user video viewing environment can present challenges. Specifically, for example, some techniques might apply a certain watermark to an entire video (or all chunks of a video) to mark any and all viewed instances of that particular video as protected. This watermark might then be detected on a disclosed copy of the video or portion of the video to identify the disclosed content as originating from the watermarked video. However, this technique is deficient in identifying the source of the disclosure.

Some approaches might watermark a requested video with a unique watermark (e.g., the requestor's name) responsive to a respective request. In this case, a significant viewing delay or lag from the time of the request to the time the video can be viewed is introduced by the application of the unique watermark to the entire video. This lag can result in a degraded user experience. Further, applying a unique watermark to each instance of a video requested in a highly active multi-user environment can consume a significant amount of computing and storage resources. The limitations of such techniques are particularly evident in live video broadcast scenarios.

Many implementations of the foregoing legacy watermarking techniques reduce the quality of the viewed video content. For example, a watermark applied to a streamed video using such techniques might comprise displaying the user's name on the bottom of the viewed video. In the foregoing example, although the alteration of the original video is intended, it nonetheless reduces the viewing quality. Further, certain other selected watermarking techniques that might negligibly impact the quality of one video sequence, might significantly impact the quality of another video sequence. A technological solution is therefore needed to watermark video streams in a manner that does not appreciably detract from the fidelity of the original video sequence, yet facilitates later discovery of the source of unauthorized video dissemination.

Some of the approaches described in this background section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

SUMMARY

The present disclosure provides a detailed description of techniques used in systems, methods, and in computer program products for forensic watermarking of shared video content, which techniques advance the relevant technologies to address technological issues with legacy approaches. More specifically, the present disclosure provides a detailed description of techniques used in systems, methods, and in computer program products for efficiently watermarking streaming video content to determine the sources of disclosed content. Certain embodiments are directed to technological solutions for encoding a user identifier and/or session identifier into a sequence of video chunks by selecting a watermarking scheme for each chunk based on a respective portion of the identifier(s).

The disclosed embodiments modify and improve over legacy approaches. In particular, the herein-disclosed techniques provide technical solutions that address the technical problems attendant to discovering the source of unauthorized disclosures of watermarked video in a multi-user streaming and/or live video viewing environment. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of forensic watermarking as well as advances in various technical fields related to video storage systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

DETAILED DESCRIPTION

Figure 1A:
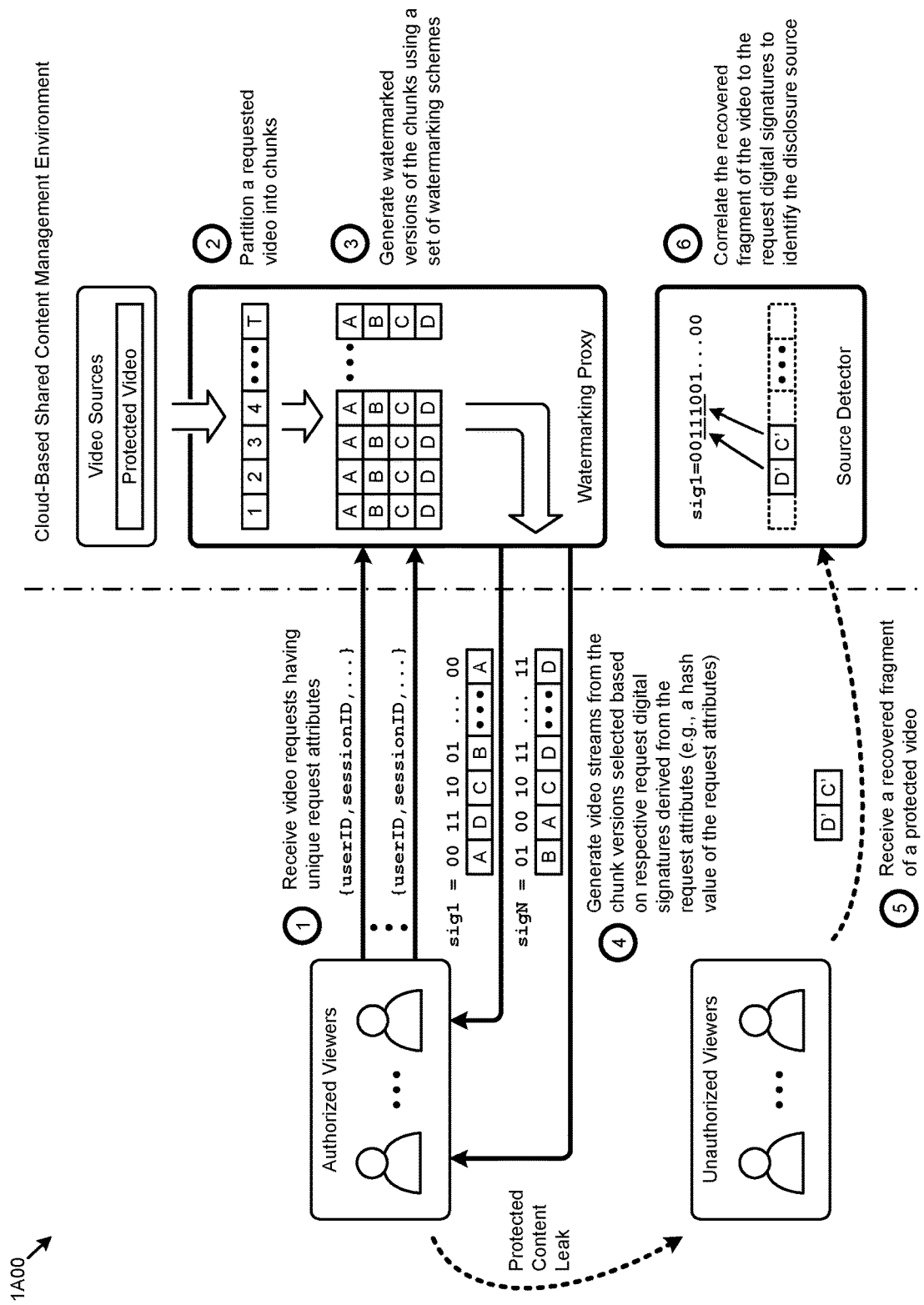
FIG. 1A is a diagrammatic representation of a forensic watermarking scenario, according to an embodiment.

Embodiments in accordance with the present disclosure address the problem of discovering the source of unauthorized disclosures of watermarked video in a multi-user streaming and/or live video viewing environment. Some embodiments are directed to approaches for dynamically encoding a user identifier and/or session identifier into a sequence of video chunks by selecting a watermarking scheme for each chunk based on a respective portion of the identifier(s). The accompanying figures and discussions herein present example environments, systems, methods, and computer program products for efficiently watermarking streaming video content to determine the sources of disclosed content.

Overview

Disclosed herein are techniques for dynamically applying watermarking schemes to a sequence of streaming video. A series of sequences of selected video is watermarked in a manner that encodes one or more unique video requestor attributes, such as a user identifier and/or session identifier into the series. In certain embodiments, a stored video or live video stream is partitioned into chunks. One or more watermarking schemes are applied to the chunks to generate variations of watermarked chunks (e.g., high-fidelity versions of the respective chunks). The number of watermarking schemes can vary. When a request to view the video is received from a user, a request digital signature is derived from a set of unique request attributes, such as a user identifier and/or a session identifier. The request digital signature is used to select a unique sequence of watermarked chunk versions to comprise the video stream to present to the user, thereby encoding the request digital signature into the video stream. In certain embodiments, a recovered fragment of an earlier requested video (e.g., a fragment that had been disclosed to an unauthorized viewer) can be analyzed to detect the sequence of watermarked chunk versions in the recovered fragment. The detected sequence is correlated to the request digital signatures (and request attributes) associated with all the requests for that particular video to determine, within a statistical certainty, the identity of the requestor (e.g., malicious user, pirate, etc.) associated with the recovered video fragment.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A is a diagrammatic representation of a forensic watermarking scenario 1A00. As an option, one or more variations of forensic watermarking scenario 1A00 or any aspect thereof may be implemented in the context of the architecture and functionality of the embodiments described herein. The forensic watermarking scenario 1A00 or any aspect thereof may be implemented in any environment.

The forensic watermarking scenario 1A00 presented in FIG. 1A illustrates a scenario that uses the herein disclosed techniques for efficiently watermarking streaming video content to determine the source of unauthorized disclosure of the content. As can be observed, in certain cloud-based shared content management environments, requests to view protected videos accessible from various video sources can be received from multiple users (operation 1). In some cases, the protected videos requested by the users can be disclosed (e.g., leaked, whether by accident or with malicious intent) by means of an unmonitored sharing of the video. In such cases, the content owners might want to determine the source (e.g., perpetrating distributor) of the unauthorized disclosure.

The herein disclosed techniques can be implemented as shown in the forensic watermarking scenario 1A00 to facilitate discovery the source of such unauthorized disclosures of watermarked video in a multi-user streaming and/or live video viewing environment. In certain embodiments, such techniques can be implemented in a watermarking proxy and/or a source detector. As shown, the requested video can be partitioned into chunks at the watermarking proxy (operation 2). For example, a requested video might be partitioned into T chunks that are five seconds in length (e.g., T=720 for a one-hour video). The chunks serve to facilitate a low latency streaming of the video to the user, but also serve to facilitate the herein disclosed forensic watermarking techniques. Specifically, a set of watermarking schemes (e.g., scheme A, scheme B, scheme C, and scheme D) are applied to the chunks to generate a set of watermarked chunk versions for the respective chunks (operation 3).

In the shown scenario, four versions of each chunk are generated, each version being generated using a different watermarking scheme. The set of watermarking schemes are selected before beginning to generate versions. The watermarking schemes can have a one-to-one correspondence to a particular algorithm and/or set of parameters that cause a respective algorithm generate distinguishably different video versions. For example, an algorithm might be stated as, "choose a subsequence of frames within the chunk and apply a predetermined set of frame-delete and frame-duplicate operations to the subsequence". An algorithm of this form can produce multiple versions per subsequence, merely by changing parameters pertaining to the set of frame-delete and frame-duplicate operations.

As such, by changing values or combinations of the aforementioned parameters, many versions can be produced by one algorithm based on variations of parameter configurations comprising parameter values and/or parameter combinations. A set of preferred parameter configurations can be determined by running the algorithm over test sets of subsequences, measuring the distinguishability of the resulting versions, and then selecting a subset of parameter configurations that result in chunk versions that are easily distinguishable from other chunk versions. This can be implemented in a test scenario comprising multiple stages: For example, the first stage of processing determines the set of possible versions that all schemes can produce (e.g., by running all generation algorithms over all respective parameter configurations). The second stage of the processing considers that set, and eliminates members that are quantitatively determined to be of lower distinguishability, which degree of distinguishability can be calculated by any instance of a source detector 154.

In the shown scenario, four versions of each chunk are generated, resulting in a consumption of storage capacity approximately equivalent to storing four copies of the requested video. The number of watermarking schemes and resulting number of watermarked chunk versions and amount of consumed storage capacity can vary. The unique set of request attributes (e.g., "userID", "sessionID", etc.) that characterize a given request are then used to generate a request digital signature (e.g., "sig1" and "sig2"), which in turn is used to select a unique sequence of watermarked chunk versions to comprise the video stream to present to the user (operation 4). The request digital signature is thereby encoded in the watermarking of the resulting video stream received by the user. As can be observed, the representative video streams illustrated in FIG. 1A comprise different sequences of watermarked chunk versions.

As earlier mentioned, some or all of this video stream might be disclosed (e.g., in a protected content leak) to one or more unauthorized viewers. Such disclosures are often discovered when a fragment of the video stream is recovered (operation 5). For example, a recovered video fragment comprising a sequence of two chunks watermarked with scheme D and scheme C, respectively, might be received at the source detector. As shown, the sequence might include noise such that the two chunks watermarked with scheme D and scheme C might be received as sequence of two chunks D' and C', where the notation of D' and C' represents the two chunks watermarked with scheme D and scheme C, even though the recovered video fragments might include some noise, and/or might be stripped of its metadata.

When the underlying requested video associated with the recovered video fragment is identified, the source detector can correlate the watermarked chunk version of the recovered fragment to the request digital signatures associated with the underlying video to identify the disclosure source (operation 6). For example, the source detector might determine that the recovered video fragment is strongly correlated to request digital signature "sig1", as shown. Specifically, the particular request attributes (e.g., "userID", "sessionID", etc.) associated with signature "sig1" can be extracted to identify the source.

In certain embodiments, a recovered fragment of an earlier requested video (e.g., disclosed to an unauthorized viewer) can be analyzed to detect the sequence of watermarked chunk versions in the recovered fragment. The detected sequence is correlated to the request digital signatures (and request attributes) associated with all the requests for that particular video to determine, within a statistical certainty, the requestor (e.g., disclosure source, pirate, etc.) associated with the recovered video fragment.

Figure 1B:
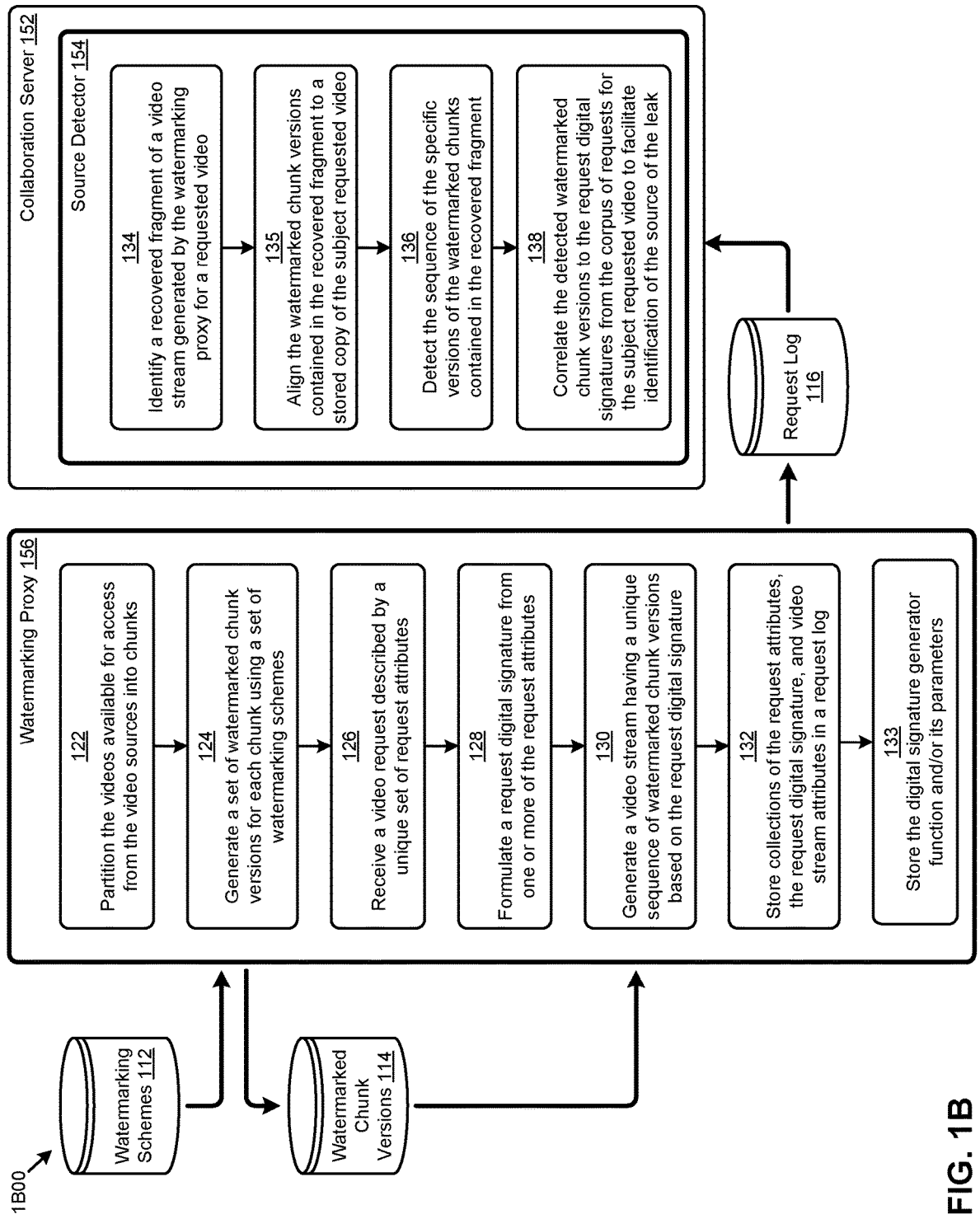
FIG. 1B depicts a dynamic forensic watermarking technique as implemented in systems for efficiently watermarking streaming video content to determine the sources of disclosed content, according to an embodiment.

Further details describing the herein disclosed techniques for efficiently watermarking streaming video content to determine the sources of disclosed content are shown and described as pertaining to FIG. 1B.

FIG. 1B depicts a dynamic forensic watermarking technique 1B00 as implemented in systems for efficiently watermarking streaming video content to determine the sources of disclosed content. As an option, one or more variations of dynamic forensic watermarking technique 1B00 or any aspect thereof may be implemented in the context of the architecture and functionality of the embodiments described herein. The dynamic forensic watermarking technique 1B00 or any aspect thereof may be implemented in any environment.

The dynamic forensic watermarking technique 1B00 presents one embodiment of certain steps and/or operations for efficiently watermarking streaming video content to determine the sources of disclosed content according to the herein disclosed techniques. In one or more embodiments, the steps and underlying operations comprising dynamic forensic watermarking technique 1B00 can be executed by a watermarking proxy 156 and a source detector 154 operating at a collaboration server 152. Certain other system components (e.g., storage facilities) coupled to the watermarking proxy 156 and collaboration server 152 are also shown for reference. Specifically, a set of watermarking schemes 112, a collection of watermarked chunk versions 114, and a request log 116 are shown. The dynamic forensic watermarking technique 1B00 can commence by partitioning the videos available for access from various video sources into chunks (step 122). A set of watermarked chunk versions for each respective chunk is then generated using the watermarking schemes 112 (step 124). For example, the generated versions can be stored in the watermarked chunk versions 114. The foregoing partitioning and/or watermarking might be performed, for example, on stored pre-recorded video content in a background process. As another example, the partitioning and/or watermarking might be performed on real time video streams (e.g., on live broadcast video streams). Various video requests characterized by a respective unique set of request attributes are received (step 126). For example, the request attributes might comprise a user identifier and a session identifier that will be unique for each request. One or more of the received request attributes are then used to generate a request digital signature corresponding to each request (step 128). A video stream to deliver to a given requestor is generated by selecting from the watermarked chunk versions 114 a unique sequence of watermarked chunks according to the request digital signature of the requestor (step 130). The resulting video stream is thereby encoded with the unique request digital signature of the requestor, but encoded in a manner (e.g., using certain watermarking techniques) that negligibly impacts the quality of the viewed video content. A collection of the request attributes, the request digital signature, and certain video stream attributes for each delivered video stream are stored in the request log 116 (step 132). In some cases (e.g., when watermarking live video), and as depicted at step 133, a digital signature generator function and/or its parameters might also be stored. A copy of the live video is stored in its original video source form for use in determination or confirmation of unauthorized disclosure and/or in determination or discovery of the source (e.g., based on the digital signature) of unauthorized disclosure of the requested video or fragment thereof. Further details regarding digital signature generator functions are discussed as pertains to FIG. 5.

The data in the request log 116 and/or other information can be used by the source detector 154 to determine the sources of disclosed content according to the herein disclosed techniques. Specifically, as illustrated, a recovered video fragment, and underlying subject requested video, of a video stream generated by the watermarking proxy 156 can be identified (step 134). The recovered video fragment is analyzed to align the watermarked chunk versions contained in the recovered fragment to a stored copy of the subject requested video (step 135) and to detect the specific sequence of the specific versions of the watermarked chunk versions contained in the recovered fragment (step 136). The detected watermarked chunk versions provide an indication, for example, of a corresponding portion of the request digital signature encoded in the fragment. As such, the detected watermarked chunk versions can be correlated to the request digital signatures from the corpus of requests for the subject requested video (e.g., from the request log 116) to facilitate identification of the originator of the leaked fragment (step 138).

Figure 2:
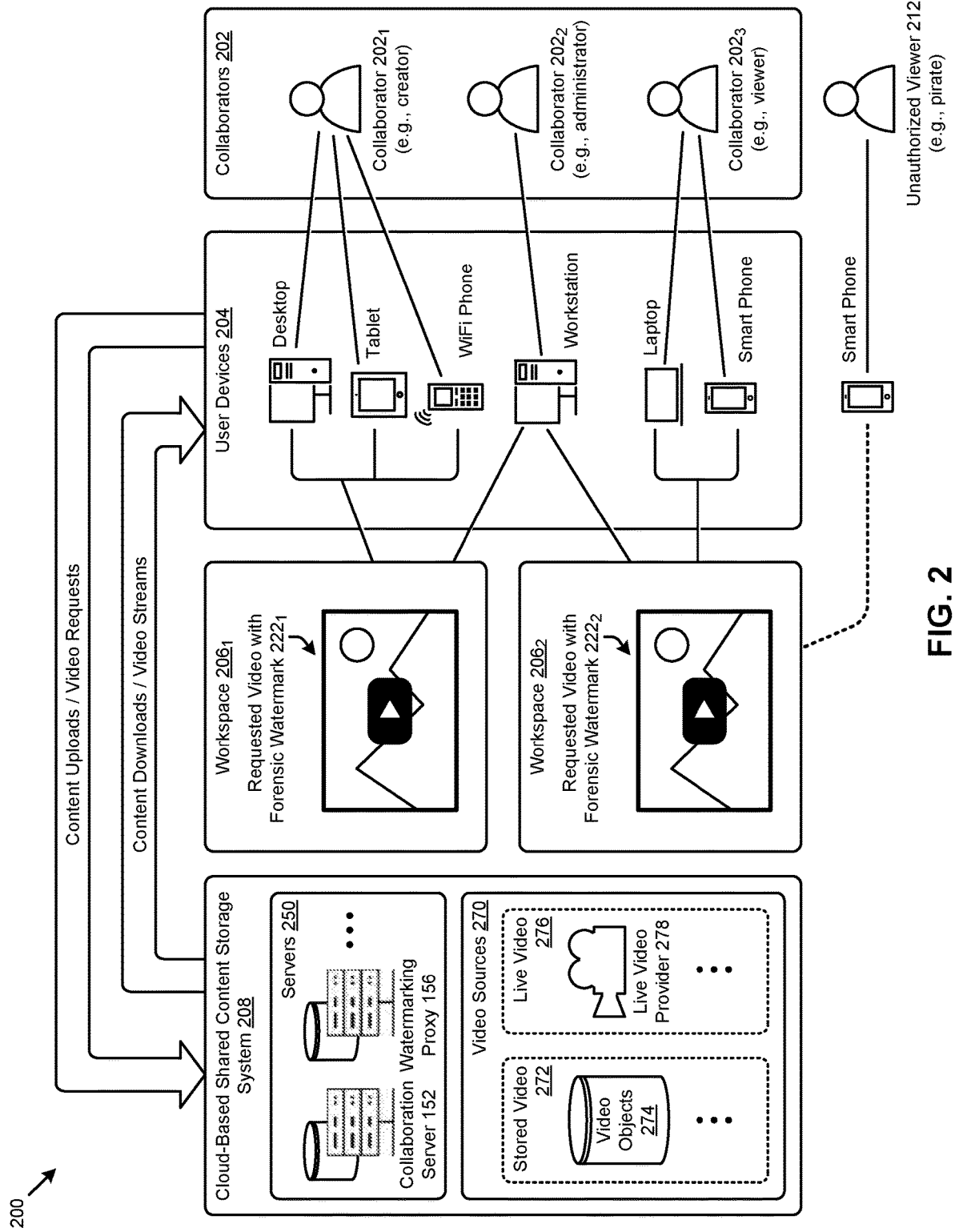
FIG. 2 presents a cloud-based environment having a cloud-based shared content management platform to implement forensic watermarking of streaming video content, according to an embodiment.

Further details pertaining to implementing the herein disclosed techniques in the cloud-based environment are described and shown as pertaining to FIG. 2.

FIG. 2 presents a cloud-based environment 200 having a cloud-based shared content management platform to implement forensic watermarking of streaming video content. As an option, one or more variations of cloud-based environment 200 or any aspect thereof may be implemented in the context of the architecture and functionality of the embodiments described herein.

As shown in FIG. 2, certain users (e.g., collaborators 202) having various collaboration roles (e.g., creator, administrator, viewer, editor, approver, auditor, reviewer, etc.) can use one or more instances of user devices 204 to interact with one or more workspaces (e.g., workspace $206_1$, workspace $206_2$, etc.) facilitated by a cloud-based shared content storage system 208 in the cloud-based environment 200. As an example, collaborator $202_1$ might be a content creator (e.g., video producer) with access to workspace $206_1$, collaborator $202_3$ might be a video viewer with access to workspace $206_2$, and collaborator $202_2$ might be an administrator with access to both workspaces. The workspaces can be stored in any location, and are at least partially maintained by components within the cloud-based shared content storage system 208. The cloud-based shared content storage system 208 supports any variety of processing elements and/or servers 250 such as collaboration server 152 (e.g., comprising a source detector), watermarking proxy 156, a content management server, a host server, a sync server, an application server, a cloud drive server, a content server, and/or other processing elements. The cloud-based shared content storage system 208 further facilitates access by the foregoing processing elements to any variety of storage devices and video sources 270, such as sources of stored video 272 (e.g., video objects 274) and/or sources of live video 276 (e.g., live video provider 278).

Any of the users can be provisioned authorized access to various portions of the content objects stored in the aforementioned storage devices and/or various portions of the video content from the video sources 270 without the additional process of manually downloading and storing a file locally on an instance of the user devices 204 (e.g., a desktop computer, a tablet, a WiFi phone, a workstation, a laptop computer, a smart phone, etc.). For example, one of the content objects (e.g., video file, computer file, text document, audio file, image file, etc.) created by collaborator $202_1$ might be viewed by collaborator $202_3$ without informing the collaborator $202_3$ where the file is physically stored in the storage devices and/or the originating source (e.g., which of the video sources 270) of the content object. Such a facility streamlines the frequently repeated sharing and/or collaboration processes.

More specifically, the aforementioned workspaces can facilitate access to certain video content accessed (e.g., requested) by the collaborators. According to the herein disclosed techniques, the video content (e.g., video streams) delivered to the workspaces can be watermarked (e.g., with forensic watermarking) to facilitate identification of any sources of unauthorized disclosure of the video content. Specifically, for example, a requested video with forensic watermarking $222_1$ might be presented in workspace $206_1$, and a requested video with forensic watermarking $222_2$ might be presented in workspace $206_2$. In most cases, the forensic watermarking techniques described herein, can serve to identify the source or sources of any unauthorized and/or unmonitored sharing of the requested videos. For example, a video fragment captured on the smart phone of an unauthorized viewer 212 from the workspace $206_2$ of collaborator $202_3$ can be used to identify the collaborator $202_3$ as the source (e.g., authorized requestor) of the captured content.

Figure 3:
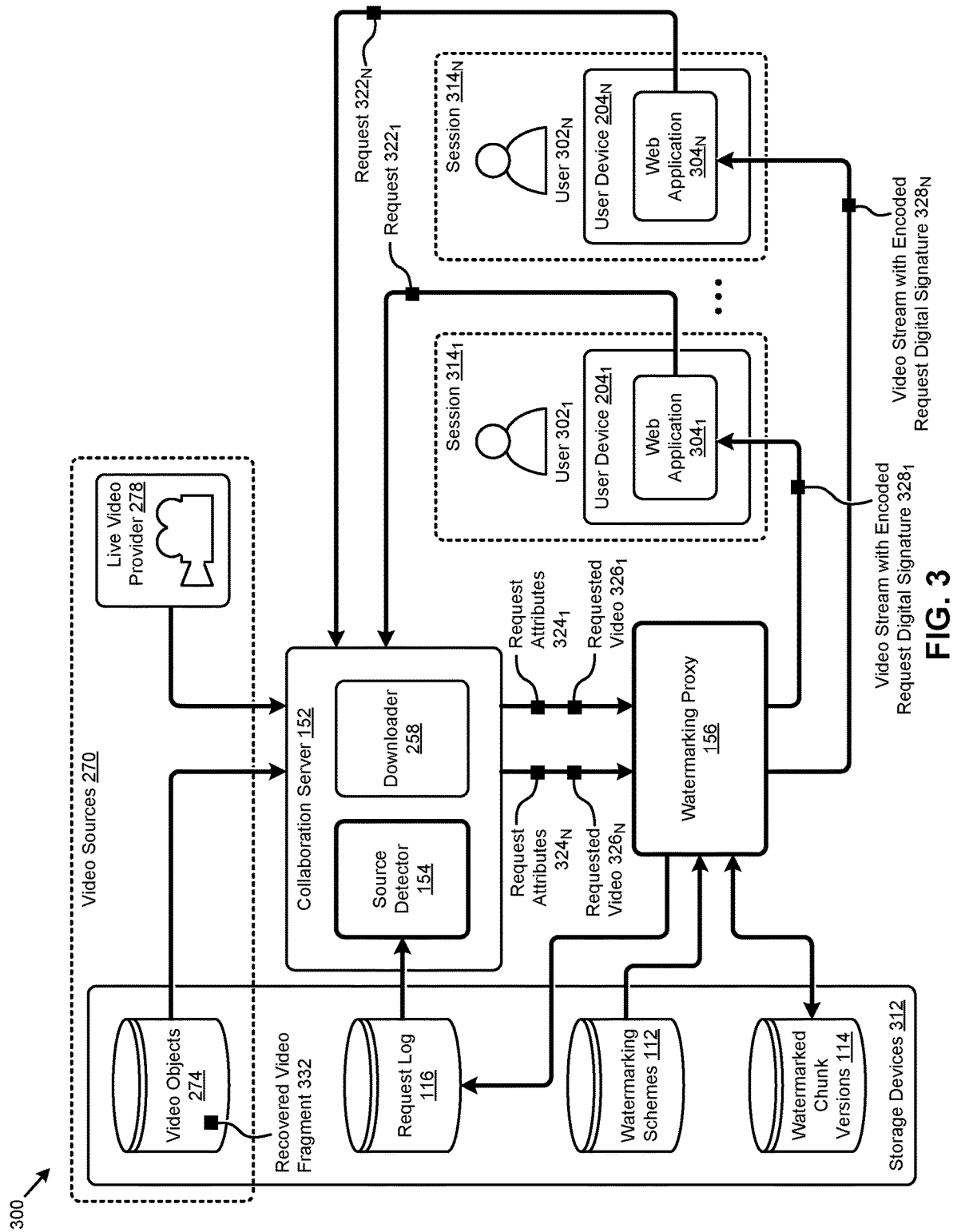
FIG. 3 presents a schematic view of a data flow to implement techniques for determination of the sources of unauthorized distributions, according to an embodiment.

One embodiment of a system comprising the watermarking proxy 156, the source detector 154, and/or other components for implementing the herein disclosed techniques is shown and described as pertaining to FIG. 3.

FIG. 3 presents a schematic view of a data flow 300 to implement techniques for determination of the sources of unauthorized distributions. As an option, one or more variations of data flow 300 or any aspect thereof may be implemented in the context of the architecture and functionality of the embodiments described herein. The data flow 300 or any aspect thereof may be implemented in any environment.

The shown data flow 300 implements forensic watermarking of video content to facilitate determination of the sources of unauthorized distributions of such video content. Collaborative and/or individual video content access can take place concurrently with other accesses in multiple concurrent sessions involving multiple users concurrently requesting and/or viewing the video content. Dynamically generating and applying the forensic watermarking to the video content and/or other operations can be performed by the watermarking proxy 156. Such a proxy server can manipulate object representations (e.g., watermarked video streams, etc.) rather than manipulating the video content source. Such manipulations or other operations can be employed in combinations with techniques performed, for example, at the source detector 154 (e.g., implemented at the collaboration server 152) to detect any sources of unauthorized distributions of the video content.

Specifically, for example, two representative users (e.g., user $302_1$ and user $302_N$) from a plurality of users might launch respective web applications (e.g., web application $304_1$ and web application $304_N$) at respective user devices (e.g., user device $204_1$ and user device $204_N$) to establish interactive sessions (e.g., session $314_1$ and session $314_N$) with a cloud-based shared content storage service to access (e.g., view) various video content. Such video content might be delivered from a set of video sources 270 accessible by the cloud-based shared content storage service. As can be observed, for example, a collaboration server 152 can receive requests (e.g., request $322_1$ and request $322_N$) from the users and/or sessions to view video content from stored video sources such as video objects 274 stored in a set of storage devices 312, or from live video sources such as the live video provider 278. A downloader 258 at the collaboration server 152 can manage the downloading of the requested video content from the video sources 270 that might be performed to fulfill the user requests.

The collaboration server 152 further interfaces with the watermarking proxy 156 to carry out at least some of the operations for implementing the herein disclosed techniques. Specifically, the request attributes (e.g., request attributes $324_1$ and request attributes $324_N$) and the requested video content (e.g., requested video $326_1$ and requested video $326_N$) pertaining to the aforementioned requests can be received at the watermarking proxy 156 from the collaboration server 152. The watermarking proxy 156 can use this information and/or other information to generate and deliver video streams to the respective users that are uniquely encoded with a respective request digital signature (e.g., video stream with encoded request digital signature $328_1$ and video stream with encoded request digital signature $328_N$). As can be observed, watermarking proxy 156 can interact with a set of watermarking schemes 112 and/or a set of watermarked chunk versions 114 stored in the storage devices 312 to facilitate the generation of the encoded video streams. Certain information (e.g., request attributes, request digital signatures, video stream attributes, etc.) pertaining to each video stream delivered by the watermarking proxy 156 is stored in a request log 116 at the storage devices 312.

In certain scenarios, various video fragments (e.g., recovered video fragments 332) from the video streams generated and delivered by the watermarking proxy 156 might be recovered. The source detector 154 at collaboration server 152 can perform certain operations that use the forensic watermarking applied by the watermarking proxy 156 to determine, at least with some quantitative statistical certainty, the original requestor of the video stream associated with the recovered video fragment. Specifically, source detector 154 can access the information in the request log 116 and/or other information to correlate the portion of the request digital signature encoded in the recovered video fragment to a corpus of request digital signatures for the same underlying video content to facilitate identification of the original requestor.

The components and data flows shown in FIG. 3 present merely one partitioning and associated data manipulation approach. The specific example shown is purely exemplary, and other subsystems and/or partitioning are reasonable. One embodiment of a protocol implemented in such systems, subsystems, and/or partitionings according to the herein disclosed techniques is presented and discussed as pertains to FIG. 4A and FIG. 4B.

Figure 4A:
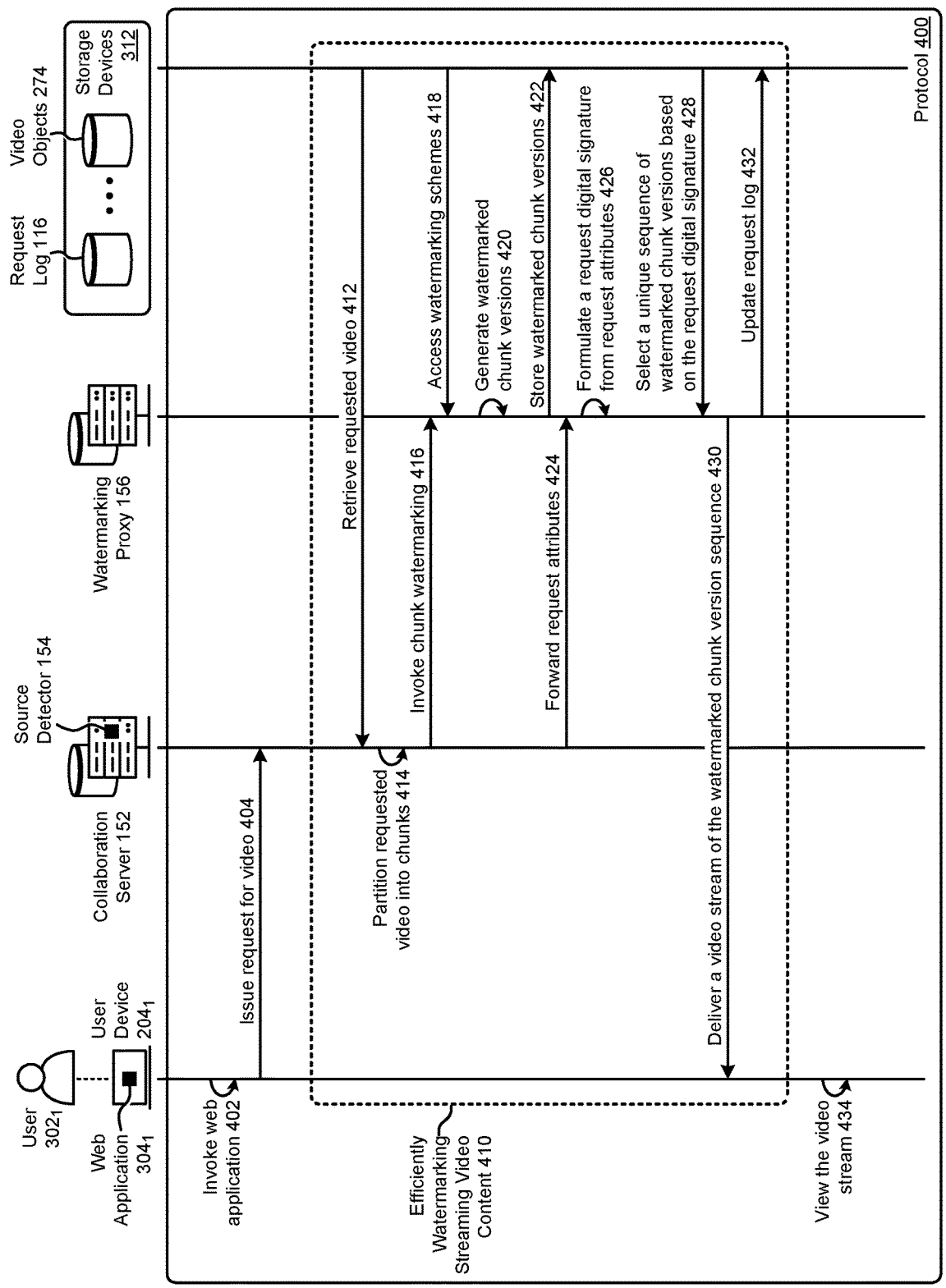
FIG. 4A and FIG. 4B depict a protocol used by cloud-based shared content storage system components for efficiently watermarking streaming video content for subsequent determination of the sources of unauthorized disclosures, according to an embodiment.
Figure 4B:
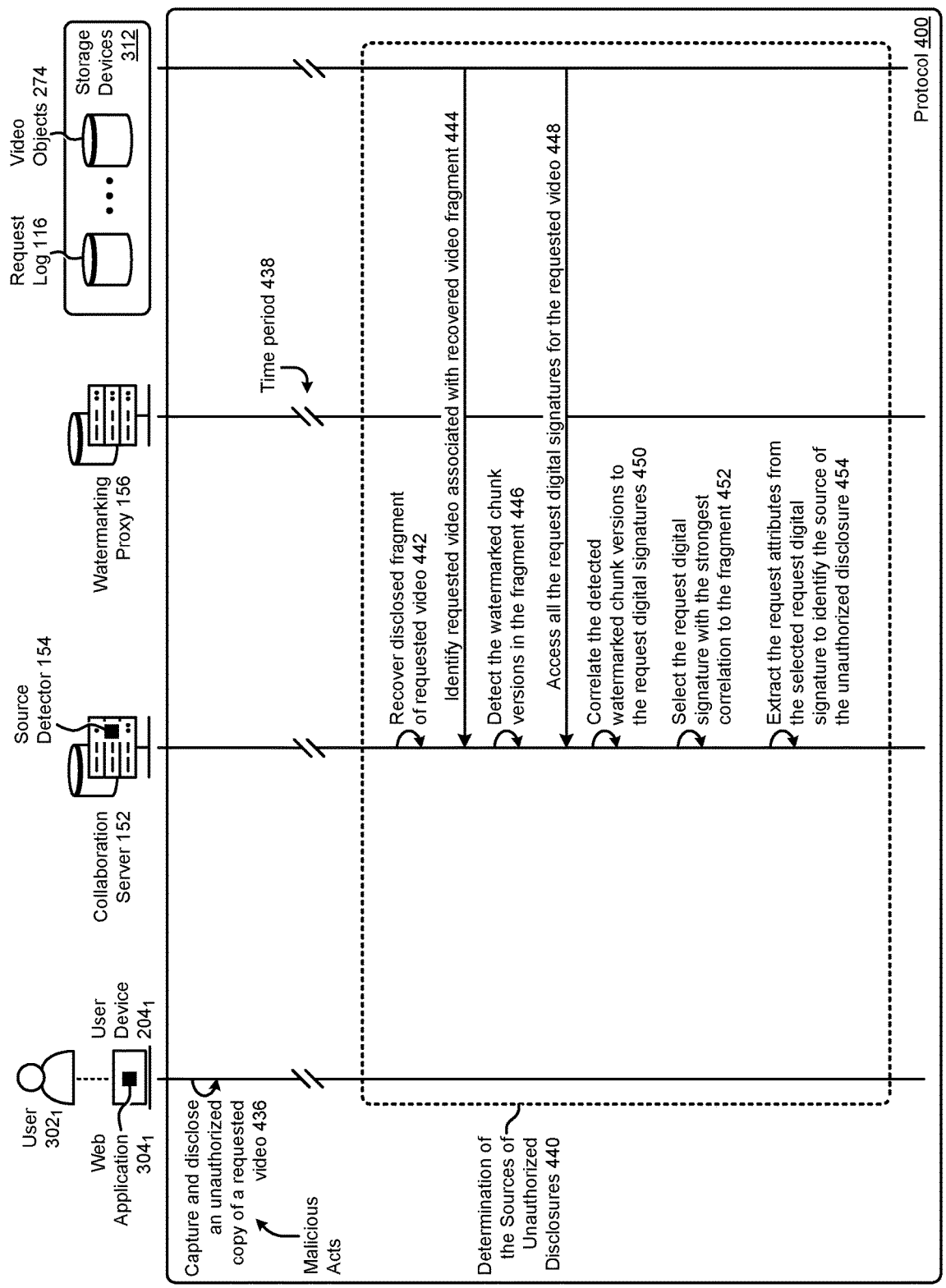

FIG. 4A and FIG. 4B depict a protocol 400 used by cloud-based shared content storage system components for efficiently watermarking streaming video content for subsequent determination of the sources of unauthorized disclosures. As an option, one or more variations of protocol 400 or any aspect thereof may be implemented in the context of the architecture and functionality of the embodiments described herein. The protocol 400 or any aspect thereof may be implemented in any environment.

As shown in both FIG. 4A and FIG. 4B, the protocol 400 comprises interactions between various computing system entities (e.g., servers, devices, sources, applications, etc.) shown and described as pertaining to FIG. 3 and elsewhere herein. The shown entities can communicate information (e.g., data, files, objects, messages, requests, data downloads, data uploads, etc.) over a network comprising any combination of a wide area network (e.g., WAN), local area network (e.g., LAN), cellular network, wireless LAN (e.g., WLAN), the Internet, and/or any such capability for facilitating communication in computing systems and entities. As shown, the entities interacting in protocol 400 in FIG. 4A and FIG. 4B comprise at least one instance of the collaboration server 152, at least one instance of the watermarking proxy 156, and at least one instance of the storage devices 312. As further shown, an instance of the source detector 154 is implemented in the collaboration server 152. Representative data stores (e.g., video objects 274 and request log 116) at the storage devices 312 are also depicted. Other data stores (e.g., watermarking schemes, watermarked chunk versions, etc.) might also be facilitated by the storage devices 312. The aforementioned servers and storage devices can represent any single computing system with dedicated hardware and software, multiple computing systems clustered together (e.g., a server farm, a host farm, etc.), a portion of shared resources on one or more computing systems (e.g., a virtual server, virtual machine, container, etc.), or any combination thereof. For example, the collaboration server 152, watermarking proxy 156, and the storage devices 312 can comprise a cloud-based content management platform that provides shared content management and storage services. The computing entities pertaining to protocol 400 can further comprise at least one instance of a user device (e.g., user device $204_1$) that can represent one of a variety of other computing devices (e.g., a smart phone, a tablet, a WiFi phone, a laptop, a workstation, etc.) having software (e.g., operating system, applications, etc.), such as web application $304_1$, and hardware (e.g., a graphics processing unit, display, monitor, etc.) capable of processing and displaying information (e.g., web page, graphical user interface, etc.) on a display. As shown, the user device $204_1$ can be operated by the user $302_1$.

As shown in FIG. 4A, the user device $204_1$, the collaboration server 152, the watermarking proxy 156, and the storage devices 312 can exhibit a set of high order interactions (e.g., operations, messages, etc.) pertaining to a portion of protocol 400. Specifically, user $302_1$ can invoke the web application $304_1$ at user device $204_1$ (operation 402) to issue a request for a video to the collaboration server 152 (message 404). A set of interactions (see grouping 410) to efficiently watermark the streaming video content served to user $302_1$ in response to the issued request can commence with retrieving the request video (message 412). The requested video might be retrieved, for example, from the video objects 274 at the storage devices 312 as shown, but also might be retrieved from a live video broadcast source. The retrieved video is then partitioned into chunks at the collaboration server 152 (operation 414). The collaboration server 152 then invokes a chunk watermarking process at the watermarking proxy 156 (message 416). The watermarking proxy 156 accesses a set of watermarking schemes (e.g., at the storage devices 312) (message 418) to generate a set of watermarked chunk versions for each respective chunk of the requested video (operation 420). These watermarked chunk versions are stored at the storage devices 312 (message 422).

At some moment in time, the request attributes pertaining to the request issued by user $302_1$ are forwarded from collaboration server 152 to watermarking proxy 156 (message 424). The watermarking proxy 156 uses at least some of the request attributes to generate a request digital signature that is unique to the original request (operation 426). The watermarking proxy can then select from the stored watermarked chunk versions a unique sequence of watermarked chunks based on the request digital signature (message 428). A video stream comprising the selected sequence watermarked chunk versions is delivered to user device $204_1$ of user $302_1$ (message 430) for viewing by user $302_1$ (operation 434). Certain information (e.g., request attributes, request digital signatures, video stream attributes, etc.) pertaining to each video stream delivered by the watermarking proxy 156 is stored in the request log 116 at the storage devices 312 (message 432).

Referring to the portion of protocol 400 shown in FIG. 4B, upon viewing the video stream provided by the watermarking proxy 156 as earlier shown and described (see FIG. 4A), user $302_1$ (or another party) might capture (e.g., at another user device) and disclose an unauthorized copy of the requested video (operation 436). After a time period 438, the creator and/or owner of the video content might discover the disclosed video or portion (e.g., fragment) of the video and want to identify the source of such unauthorized disclosure. A set of interactions (see grouping 440) to determine the sources of unauthorized disclosures according to the herein disclosed techniques can commence with recovery of the disclosed fragment of the requested video (operation 442). The source detector 154 at the collaboration server 152 can use the recovered video fragment to identify the underlying requested video associated with the fragment (message 444). For example, the source detector 154 might compare the fragment to the videos from the video objects 274 at the storage devices 312 to identify the associated requested video. The watermarked chunk versions in the recovered video fragment are also detected (operation 446). The corpus of request digital signatures for the requested video are accessed (e.g., at the request log 116) (message 448) and correlated to the detected watermarked chunk versions in the recovered video fragment (operation 450). The request digital signature with the strongest correlation to the recovered video fragment is selected (operation 452). The request attributes encoded in the selected request digital signature are extracted to identify the source of the unauthorized disclosure (operation 454).

Figure 5:
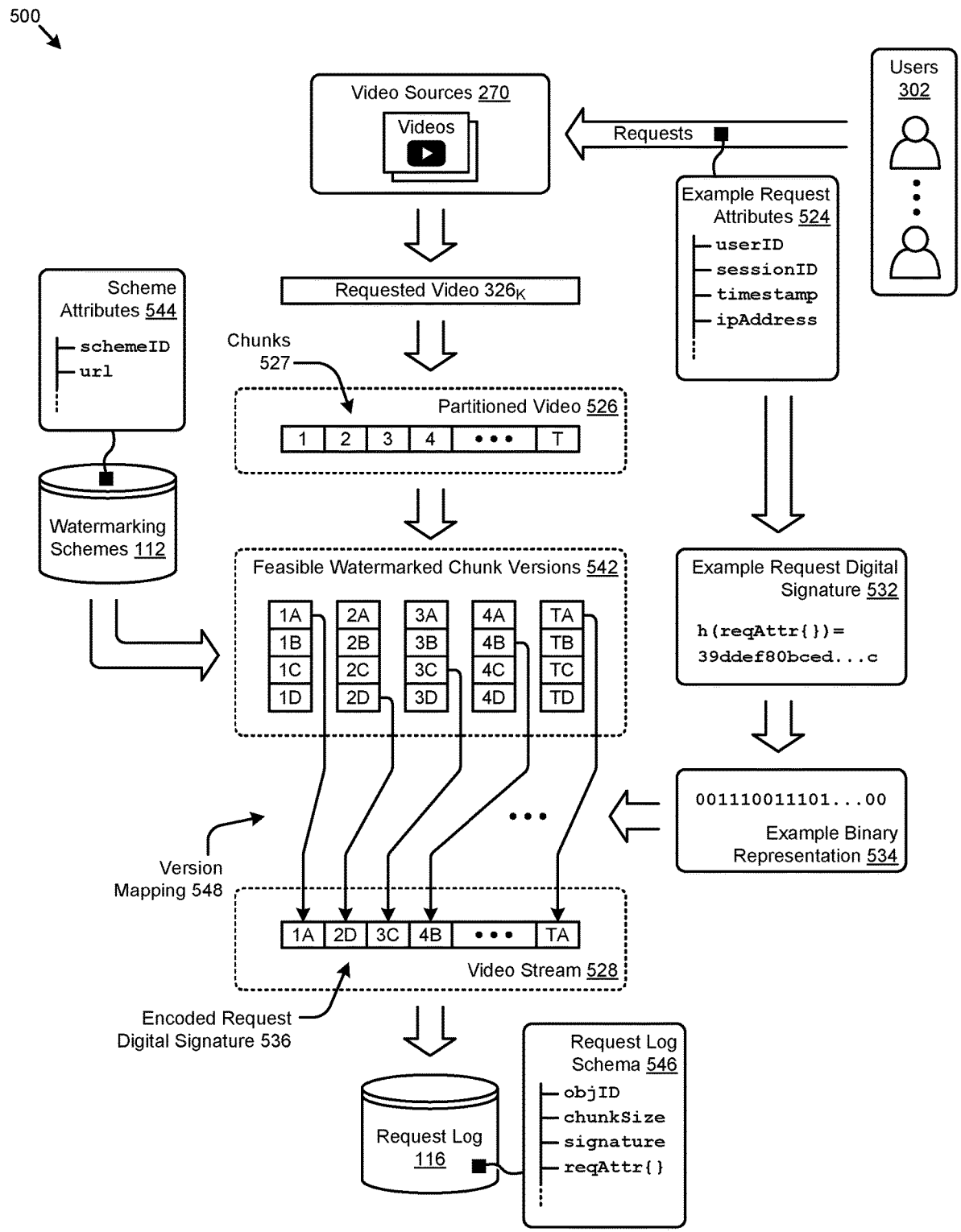
FIG. 5 depicts specialized data structures designed to improve the way a computer stores and retrieves data in memory when performing steps pertaining to efficiently watermarking streaming video to facilitate detection of sources of unauthorized disclosures, according to some embodiments.

Further details associated with the herein disclosed techniques for generating the request digital signature and encoding the signature in the video stream are shown and described as pertaining to FIG. 5.

FIG. 5 depicts specialized data structures 500 designed to improve the way a computer stores and retrieves data in memory when performing steps pertaining to efficiently watermarking streaming video to facilitate detection of sources of unauthorized disclosures. As an option, one or more variations of specialized data structures 500 or any aspect thereof may be implemented in the context of the architecture and functionality of the embodiments described herein. The specialized data structures 500 or any aspect thereof may be implemented in any environment.

More specifically, FIG. 5 depicts one embodiment of various specialized data structures that are designed to improve the way a computer stores and retrieves data in memory when performing steps and/or operations pertaining to generating request digital signatures, generating watermarked chunk versions, encoding the request digital signatures into video streams, and/or other processes. As illustrated in the example scenario shown in FIG. 5, a requested video $326_K$ from a set of videos provided by video sources 270 is requested by one of a plurality of users (e.g., users 302). The requests issued by users 302 can be characterized by a set of request attributes that are selected to uniquely describe a given request. The request attributes are often organized and/or transmitted and/or stored in a structured object form (e.g., JSON, XML, etc.). As an example, as depicted in the example request attributes 524, the request attributes might include a user identifier or "userID", a session identifier or "sessionID", a request "timestamp", a device "ipAddress", and/or other attributes. In some cases the request attributes might include a plurality of additional characteristics pertaining to the user, the session and/or the then-current environment. Some such additional characteristics pertaining to the user might include (1) a request identifier that is unique on a per chunk basis, (2) an identification (e.g., title) or identifying characteristics (e.g., video format) of the specific video that is the subject of the request, (3) an identification (e.g., chunk number) of which chunk is being requested in the stream, (4) an identification (e.g., chunk number) of which chunk version was actually served in response to the request, (5) a client ID that identifies a specific client-side application (e.g., browser and/or plug-ins) and application version being used during the session, (6) a set of IP addresses of the path to the requestor's client application, (7) an indication of the user's location, and/or (8) an indication of the user's time zone.

Some of such characteristics might be used in forming signatures that uniquely describe a given request. In some cases, some of such characteristics might be logged to a logging service. Analysis of certain log entries taken from a log (e.g., request log 116) can help the source detector 154 to identify which chunks were actually delivered to a requesting user. Having an indication that a particular watermarked chunk was actually delivered to a requestor, or whether the particular watermarked chunk was never actually delivered to a requestor can aid in eliminating some users as potential unauthorized disclosers.

Any selection of, or any ordered combinations of these request attributes can be used to generate a request digital signature that is unique to each particular request. For example, a generator function (e.g., SHA-1, SHA-256, MD5, a parameterized hash function, etc.) might be applied to userID+sessionID to generate the request digital signature. As noted above, the session itself may comprise a plurality of attributes that can be used in formation of a digital signature and/or for logging purposes. Strictly as examples, a session attribute might include all or portions of (1) a session ID that is unique per video viewing session, (2) a video ID that describes which video was requested, (3) a user ID of the user who requested the video, (4) a chunk version sequence ID comprising a list of chunk version numbers that correspond to the session, and/or (5) other attributes or characteristics of the particular session.

In some embodiments, a chunk version sequence is generated so as to be unique per user. This technique serves to avoid an attack where same user queries same video multiple times, observes different chunk versions, and then re-stitches the different observed chunks together in an effort to confound detection. In this case, the detector may not may not be able to detect the timing of the disclosure. In other embodiments, the chunk version sequence is assigned based on a combination of user characteristics and session characteristics such as timestamps pertaining to a session, in which case the detector can detect the timing of the unauthorized disclosure.

Still other techniques for generating the request digital signature and/or a corresponding chunk version sequence are possible. In some cases, a binary representation of the request digital signature is generated. For example, the example binary representation 534 presented in FIG. 5 is the result of a conversion of the hexadecimal representation of the example request digital signature 532 to a binary representation. In some embodiments, the binary representation of a request digital signature can be used to select the watermarked chunk versions that comprise a video stream encoded with the request digital signature as discussed as follows and herein.

As can be observed in FIG. 5, the requested video $326_K$ is partitioned into a certain number of chunk 527 (e.g., T chunks) as illustrated by the partitioned video 526. A set of watermarking schemes 112 are accessed to generate various versions of a given chunk that are watermarked using a different one of the watermarking schemes. The data describing the watermarking schemes 112 are often organized and/or stored in a tabular structure (e.g., relational database table) having rows corresponding to a particular scheme and columns corresponding to various attributes pertaining to that scheme. For example, as depicted in the scheme attributes 544, a table row might describe a scheme identifier or "schemeID" (e.g., "A", "B", "C", "D", etc.), a scheme function call location or "url" (e.g., "http://1.2.3.4:8888/schemeA/"), and/or other attributes. The schemes from watermarking schemes 112 can be called, in turn, to generate the watermarked chunk versions for each chunk. The feasible watermarked chunk versions 542 illustrate a set of watermarked chunk versions generated for the partitioned video 526 from a set of four (e.g., "A", "B", "C", and "D") watermarking schemes.

The earlier described binary representation (e.g., example binary representation 534) of the example request digital signature 532 can be used to select watermarked chunk versions from the feasible watermarked chunk versions 542 to produce a video stream 528 that is encoded with the request digital signature (e.g., encoded request digital signature 536). Specifically, given that four feasible versions for each chunk are available, each pair of two bits of the example binary representation 534 is analyzed to select the version for each chunk to include in the video stream. For example, as shown in a version mapping 548, a bit pair of "00" will select the "A" watermarked version, a bit pair of "01" will select the "B" watermarked version, a bit pair of "10" will select the "C" watermarked version, and a bit pair of "11" will select the "D" watermarked version. Fewer or more bits from the binary representation can be used to select the version (e.g., when fewer or more watermarking schemes are available).

Certain information pertaining to the video stream 528 is stored in the request log 116. The data comprising the request log 116 are often organized and/or stored in a tabular structure (e.g., relational database table) having rows corresponding to a particular requested video content object and columns corresponding to various attributes pertaining to that video object. For example, as depicted in the request log schema 546, a table row might describe a request video object identifier or "objID", a chunk size or "chunkSize" for the requested video, the associated request digital signature or "signature", a list of request attributes or "reqAttr", and/or other information. The information in the request log 116 and/or other information can be used by the herein disclosed techniques to determine the sources of disclosed content (e.g., videos, video streams, video fragments, etc.) as shown and described as pertaining to FIG. 6.

Figure 6:
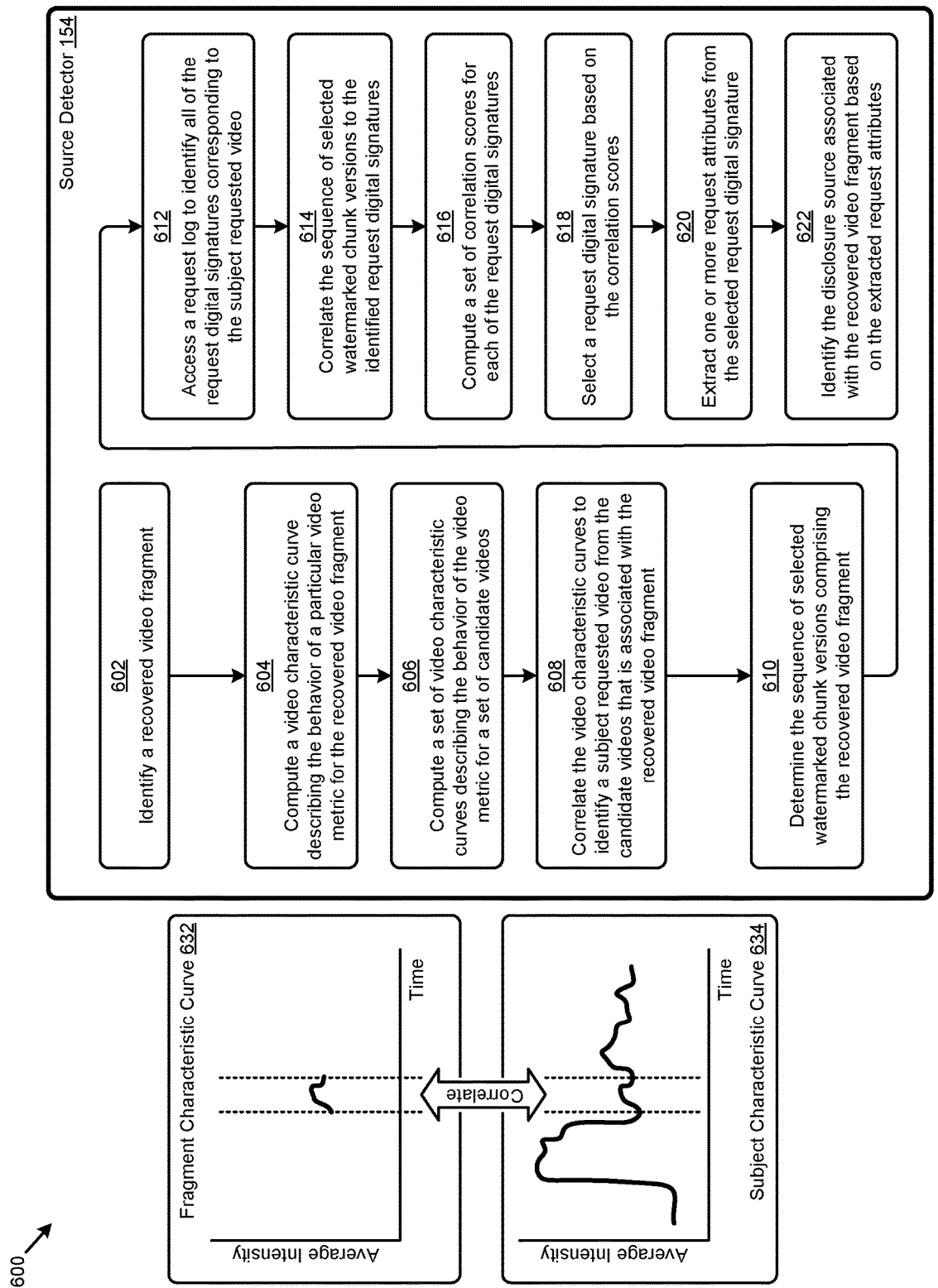
FIG. 6 presents a disclosure source identification technique as implemented in systems for efficiently watermarking streaming video content to determine the sources of disclosed content, according to an embodiment.

FIG. 6 presents a disclosure source identification technique 600 as implemented in systems for efficiently watermarking streaming video content to determine the sources of disclosed content. As an option, one or more variations of disclosure source identification technique 600 or any aspect thereof may be implemented in the context of the architecture and functionality of the embodiments described herein. The disclosure source identification technique 600 or any aspect thereof may be implemented in any environment.

The disclosure source identification technique 600 presents one embodiment of certain steps and/or operations for identification of the disclosure source associated with unauthorized distribution of protected video content according to the herein disclosed techniques. In one or more embodiments, the steps and underlying operations comprising disclosure source identification technique 600 can be executed by the source detector 154 described herein. Certain illustrations corresponding to the steps and/or operations comprising disclosure source identification technique 600 are also shown for reference. Specifically, disclosure source identification technique 600 can commence by identifying a recovered video fragment (step 602). A video characteristic curve comprising a time series of measurements that characterize the behavior of a particular video metric over time can be computed for the recovered video fragment (step 604). For example, the fragment characteristic curve 632 depicting an average spectral intensity over time for the recovered video fragment might be computed. In some cases, many different sets of different video characteristic curves describing the video can also be computed (step 606). In some cases the originally-served video can be identified by a manual process (e.g., a human agent might recognize the fragment as a portion of a particular movie). In other cases the originally-served video can be identified by an automatic process by comparing a certain known and/or observed characteristics of the recovered video fragment to the known and/or observed characteristics of a set of originally-served videos. The automatic process might be probabilistic, based on a comparison metrics applied to a set of candidate videos. Candidate videos might be initially selected from a larger set of video content based on certain known and/or observed characteristics of the recovered video fragment. The video characteristic curve of the recovered video fragment (e.g., fragment characteristic curve 632) is correlated to the set of video characteristic curves of the candidate videos to identify the subject requested video associated with the recovered video fragment (step 608). For illustration purposes, a representation of the video characteristic curve of the subject recovered video (e.g., subject characteristic curve 634) identified as most strongly correlated to the video characteristic curve of the recovered video fragment is shown.

The recovered video fragment is analyzed to determine the sequence of watermarked chunk versions comprising the fragment (step 610). A request log is accessed to identify all the request digital signatures associated with requests for the subject requested video (step 612). For example, the request log might be queried with the object identifier of the subject requested video to return the set of request digital signatures. The detected sequence of watermarked chunk versions from the recovered video segment are correlated to the request digital signatures (step 614) to compute a set of correlations scores to assign to each request digital signature (step 616). For example, the correlation scores can serve to indicate a correlation strength (e.g., Pearson's correlation coefficient nearest to 1) between the request digital signatures and the sequence of watermarked chunk versions. The request digital signature having the highest correlation score is then selected (step 618) and the request attributes encoded in the selected request digital signature are extracted (step 620) to identify the disclosure source associated with the recovered video fragment (step 622). For example, a "userID" and a "sessionID" might be extracted from the selected request digital signature and mapped to (e.g., using the request log) an "ipAddress" and a "timestamp" to identify the source of the original request for the subject requested video.

Additional Embodiments of the Disclosure

Additional Practical Application Examples

Figure 7:
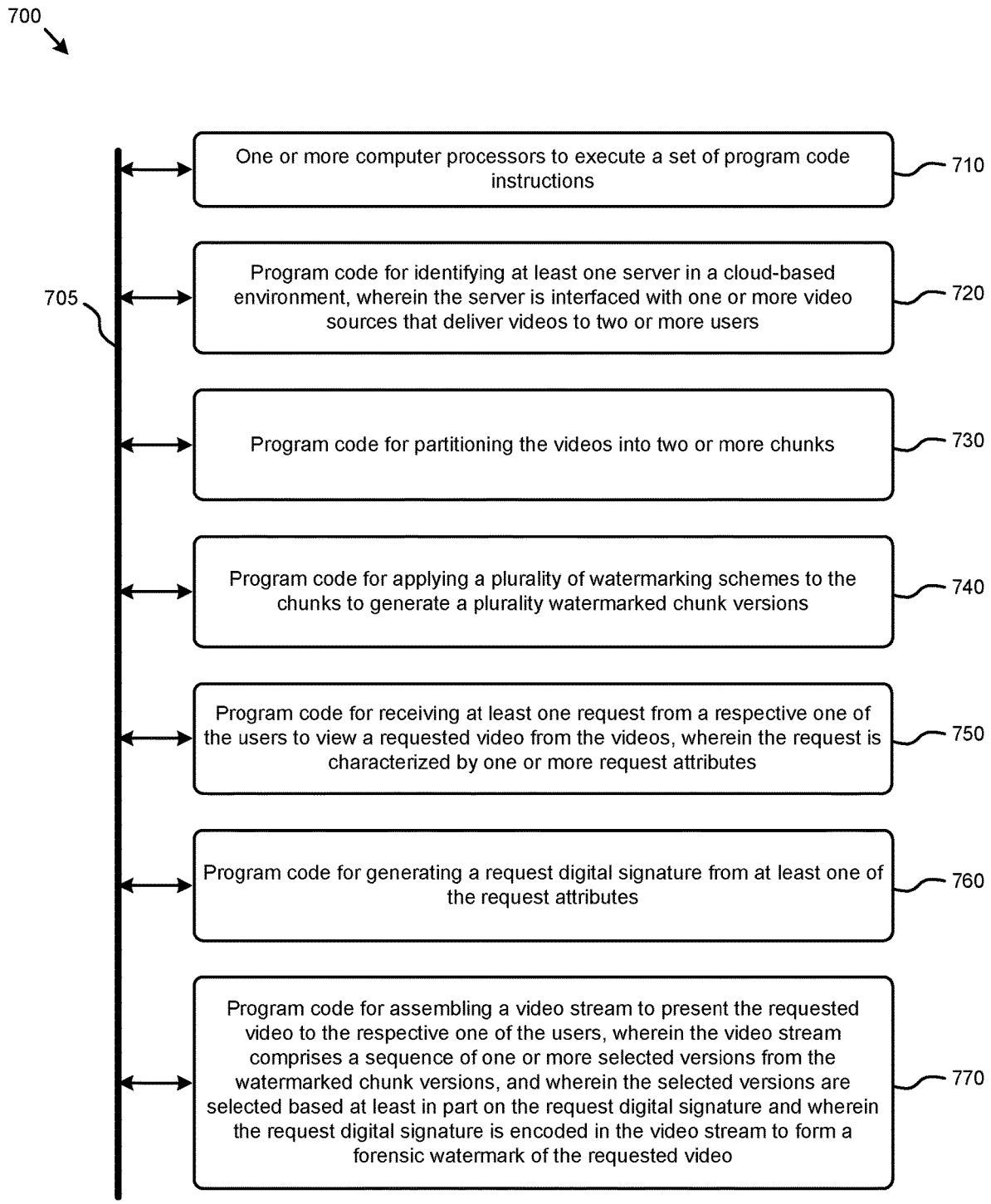
FIG. 7 depicts system components as an arrangement of computing modules that are interconnected so as to implement certain of the herein-disclosed embodiments.

FIG. 7 depicts a system 700 as an arrangement of computing modules that are interconnected so as to operate cooperatively to implement certain of the herein-disclosed embodiments. This and other embodiments present particular arrangements of elements that, individually and/or as combined, serve to form improved technological processes that address discovering the source of unauthorized disclosures of watermarked video in a multi-user streaming and/or live video viewing environment. The partitioning of system 700 is merely illustrative and other partitions are possible. As an option, the system 700 may be implemented in the context of the architecture and functionality of the embodiments described herein. Of course, however, the system 700 or any operation therein may be carried out in any desired environment. The system 700 comprises at least one processor and at least one memory, the memory serving to store program instructions corresponding to the operations of the system. As shown, an operation can be implemented in whole or in part using program instructions accessible by a module. The modules are connected to a communication path 705, and any operation can communicate with other operations over communication path 705. The modules of the system can, individually or in combination, perform method operations within system 700. Any operations performed within system 700 may be performed in any order unless as may be specified in the claims. The shown embodiment implements a portion of a computer system, presented as system 700, comprising one or more computer processors to execute a set of program code instructions (module 710) and modules for accessing memory to hold program code instructions to perform: identifying at least one server in a cloud-based environment, wherein the server is interfaced with one or more video sources that deliver videos to two or more users (module 720); partitioning the videos into two or more chunks (module 730); applying a plurality of watermarking schemes to the chunks to generate a plurality watermarked chunk versions (module 740); receiving at least one request from a respective one of the users to view a requested video from the videos, wherein the request is characterized by one or more request attributes (module 750); generating a request digital signature from at least one of the request attributes (module 760); assembling a video stream to present the requested video to the respective one of the users, wherein the video stream comprises a sequence of one or more selected versions from the watermarked chunk versions, and wherein the selected versions are selected based at least in part on the request digital signature and wherein the request digital signature is encoded in the video stream to form a forensic watermark of the requested video (module 770).

Variations of the foregoing may include more or fewer of the shown modules. Certain variations may perform more or fewer (or different) steps, and/or certain variations may use data elements in more, or in fewer (or different) operations.

System Architecture Overview

Additional System Architecture Examples

Figure 8A:
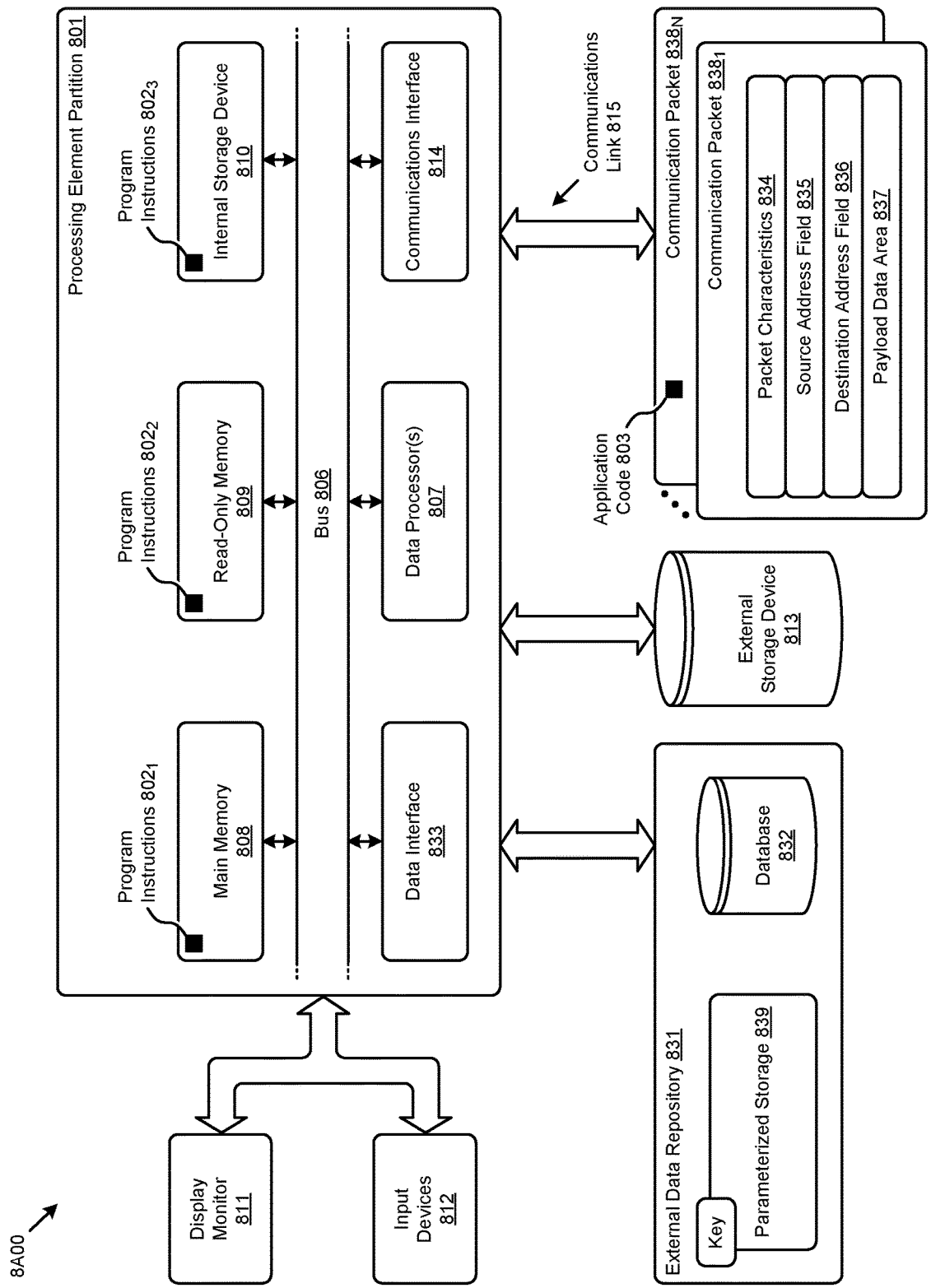
FIG. 8A and FIG. 8B present block diagrams of computer system architectures having components suitable for implementing embodiments of the present disclosure, and/or for use in the herein-described environments.

FIG. 8A depicts a block diagram of an instance of a computer system 8A00 suitable for implementing embodiments of the present disclosure. Computer system 8A00 includes a bus 806 or other communication mechanism for communicating information. The bus interconnects subsystems and devices such as a central processing unit (CPU), or a multi-core CPU (e.g., data processor 807), a system memory (e.g., main memory 808, or an area of random access memory (RAM)), a non-volatile storage device or non-volatile storage area (e.g., read-only memory 809), an internal storage device 810 or external storage device 813 (e.g., magnetic or optical), a data interface 833, a communications interface 814 (e.g., PHY, MAC, Ethernet interface, modem, etc.). The aforementioned components are shown within processing element partition 801, however other partitions are possible. The shown computer system 8A00 further comprises a display 811 (e.g., CRT or LCD), various input devices 812 (e.g., keyboard, cursor control), and an external data repository 831.

According to an embodiment of the disclosure, computer system 8A00 performs specific operations by data processor 807 executing one or more sequences of one or more program code instructions contained in a memory. Such instructions (e.g., program instructions $802_1$, program instructions $802_2$, program instructions $802_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 8A00 performs specific networking operations using one or more instances of communications interface 814. Instances of the communications interface 814 may comprise one or more networking ports that are configurable (e.g., pertaining to speed, protocol, physical layer characteristics, media access characteristics, etc.) and any particular instance of the communications interface 814 or port thereto can be configured differently from any other particular instance. Portions of a communication protocol can be carried out in whole or in part by any instance of the communications interface 814, and data (e.g., packets, data structures, bit fields, etc.) can be positioned in storage locations within communications interface 814, or within system memory, and such data can be accessed (e.g., using random access addressing, or using direct memory access DMA, etc.) by devices such as data processor 807.

The communications link 815 can be configured to transmit (e.g., send, receive, signal, etc.) any types of communication packets (e.g., communication packet $838_1$, . . . , communication packet $838_N$) comprising any organization of data items. The data items can comprise a payload data area 837, a destination address 836 (e.g., a destination IP address), a source address 835 (e.g., a source IP address), and can include various encodings or formatting of bit fields to populate the shown packet characteristics 834. In some cases the packet characteristics include a version identifier, a packet or payload length, a traffic class, a flow label, etc. In some cases the payload data area 837 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 807 for execution. Such a medium may take many forms including, but not limited to, non-volatile media and volatile media. Non-volatile media includes, for example, optical or magnetic disks such as disk drives or tape drives. Volatile media includes dynamic memory such as a random access memory.

Common forms of computer readable media includes, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 831, which in turn can be formatted into any one or more storage areas, and which can comprise parameterized storage 839 accessible by a key (e.g., filename, table name, block address, offset address, etc.).

Execution of the sequences of instructions to practice certain embodiments of the disclosure are performed by a single instance of the computer system 8A00. According to certain embodiments of the disclosure, two or more instances of computer system 8A00 coupled by a communications link 815 (e.g., LAN, PTSN, or wireless network) may perform the sequence of instructions required to practice embodiments of the disclosure using two or more instances of components of computer system 8A00.

The computer system 8A00 may transmit and receive messages such as data and/or instructions organized into a data structure (e.g., communications packets). The data structure can include program instructions (e.g., application code 803), communicated through communications link 815 and communications interface 814. Received program code may be executed by data processor 807 as it is received and/or stored in the shown storage device or in or upon any other non-volatile storage for later execution. Computer system 8A00 may communicate through a data interface 833 to a database 832 on an external data repository 831. Data items in a database can be accessed using a primary key (e.g., a relational database primary key).

The processing element partition 801 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 807. Some embodiments include one or more special-purpose hardware components (e.g., power control, logic, sensors, transducers, etc.). Some embodiments of a module include instructions that are stored in a memory for execution so as to implement algorithms that facilitate operational and/or performance characteristics pertaining to efficiently watermarking streaming video content to determine the sources of disclosed content. A module may include one or more state machines and/or combinational logic used to implement or facilitate the operational and/or performance characteristics pertaining to efficiently watermarking streaming video content to determine the sources of disclosed content.

Various implementations of the database 832 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of efficiently watermarking streaming video content to determine the sources of disclosed content). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to efficiently watermarking streaming video content to determine the sources of disclosed content, and/or for improving the way data is manipulated when performing computerized operations pertaining to dynamically encoding a user identifier and/or session identifier into a sequence of video chunks by selecting a watermarking scheme for each chunk based on a respective portion of the identifier(s).

Figure 8B:
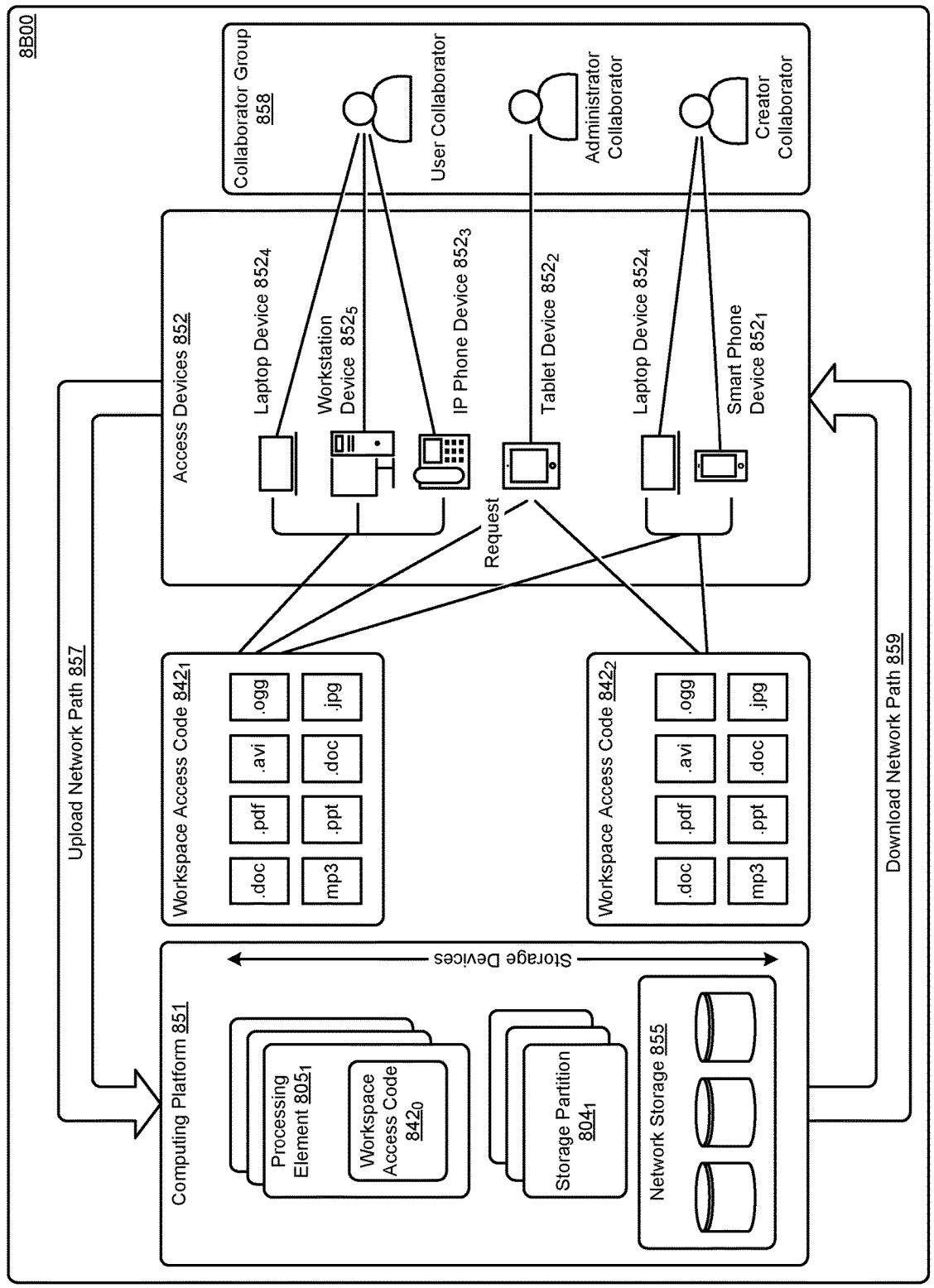

FIG. 8B depicts a block diagram of an instance of a cloud-based environment 8B00. Such a cloud-based environment supports access to workspaces through the execution of workspace access code (e.g., workspace access code $842_0$, workspace access code $842_1$, and workspace access code $842_2$). Workspace access code can be executed on any of the shown access devices 852 (e.g., laptop device $852_4$, workstation device $852_5$, IP phone device $852_3$, tablet device $852_2$, smart phone device $852_1$, etc.). A group of users can form a collaborator group 858, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and executed on any access device. Any portion of the workspace access code can reside in and be executed on any computing platform 851, including in a middleware setting. As shown, a portion of the workspace access code resides in and can be executed on one or more processing elements (e.g., processing element $805_1$). The workspace access code can interface with storage devices such as the shown networked storage 855. Storage of workspaces and/or any constituent files or objects, and/or any other code or scripts or data can be stored in any one or more storage partitions (e.g., storage partition $804_1$). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 857). A stored workspace can be delivered to a particular user and/or shared with other particular users via a download (e.g., a download from a processing element to an access device over a download network path 859).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for forensic watermarking of video content, the method comprising:

identifying at least one server, wherein the server is interfaced with one or more video sources that deliver one or more videos to one or more users;

partitioning the one or more videos into two or more chunks;

applying two or more different watermarks to the two or more chunks to generate a plurality of watermarked chunk versions of a given chunk, the two or more different watermarks corresponding to different watermarking schemes, wherein a first watermarking scheme corresponds to a first algorithm and a second watermarking scheme corresponds to a second algorithm, the first algorithm and the second algorithm being different algorithms that generate different watermarked chunk versions such that a first watermarked version of the given chunk is generated by the first algorithm and a second watermarked version of the same chunk is generated by the second algorithm;

receiving a request from a respective one of the users to view a requested video, wherein the request is characterized by one or more request attributes;

generating a digital signature based at least in part on at least one of the request attributes for identifying the respective one of the users; and encoding the digital signature into a video stream corresponding to the requested video by:

selecting a sequence of watermarked chunk versions having the different watermarking schemes based at least in part on the digital signature, wherein the sequence of watermarked chunk versions of the requested video that is correlated with the digital signature identifies the respective one of the users that receives the requested video; and initiating delivery of the requested video to the respective one of the users, wherein the requested video comprises the sequence of watermarked chunk versions that identifies the respective one of the users by correlating the sequence of watermarked chunks having the different watermarking schemes to the users, where a given order of the chunk versions for disclosed content having a first chunk generated with the first algorithm and a second chunk generated by the second algorithm is matched against the digital signature selected from a plurality of digital signatures corresponding to a respective plurality of requests to access the requested video to identify the respective one of the users as a source of unauthorized disclosure for the disclosed content.

2. The method of claim 1, further comprising:

identifying a recovered video fragment;

identifying the requested video associated with the recovered video fragment;

detecting one or more of the watermarked chunk versions that comprise the recovered video fragment;

accessing the plurality of digital signatures corresponding to the respective plurality of requests to access the requested video; and correlating the one or more of the watermarked chunk versions to the plurality of digital signatures based at least in part on the sequence of watermarked chunk versions corresponding to respective binary representations of the plurality of digital signatures, where an ordering of the first and second algorithms for the watermarked chunk versions is correlated to identify the respective one of the users as a source of unauthorized disclosure for the disclosed content.

3. The method of claim 2, wherein identifying the requested video associated with the recovered video fragment comprises acts of:

computing a plurality of video characteristic curves of a respective plurality of candidate videos, wherein the video characteristic curves comprise a first time series of measurements of at least one video metric over time;

computing a video characteristic curve of the recovered video fragment, wherein the video characteristic curve comprises a second time series of measurements of at least a portion of the recovered video fragment; and correlating the video characteristic curve of the recovered video fragment to the plurality of video characteristic curves of the candidate videos to identify the requested video.

4. The method of claim 2, further comprising computing one or more correlation scores corresponding to a respective one or more of the plurality of digital signatures, wherein the correlation scores indicate a correlation strength between the one or more of the plurality of digital signatures.

5. The method of claim 2, further comprising:

selecting at least one selected digital signature from the plurality of digital signatures;

extracting one or more of the request attributes from the selected digital signature; and identifying at least one of the users from the request attributes extracted from the selected digital signature.

6. The method of claim 1, further comprising storing in a request log comprising at least one of, the digital signature, the one or more request attributes, one or more additional characteristics pertaining to the user, or one or more requested video attributes.

7. The method of claim 1, wherein the video sources comprise at least one of, one or more storage devices that store a pre-recorded copy of the video, or one or more live video broadcast sources that deliver at least one real time video stream.

8. The method of claim 1, wherein the request attributes comprise at least one of, a user identifier, a session identifier, a timestamp, an IP address, an indication that a particular watermarked chunk was actually delivered to a requestor, or an indication that a particular watermarked chunk was never actually delivered to the requestor.

9. The method of claim 1, wherein the digital signature is at least one of, a hash value, an integer sequence, or a bit sequence.

10. The method of claim 1, further comprising evaluating a set of watermarking techniques by measuring a degree of distinguishability of a set of candidate watermarked chunk versions and selecting at least some evaluated watermarking techniques that generate candidate watermarked chunk versions that are distinguishable from other chunk versions.

11. A computer readable medium, embodied in a non-transitory computer readable medium, the non-transitory computer readable medium having stored thereon a sequence of instructions which, when stored in memory and executed by one or more processors causes the one or more processors to perform a set of acts for forensic watermarking of video content, the acts comprising:

identifying at least one server, wherein the server is interfaced with one or more video sources that deliver one or more videos to one or more users;

partitioning the one or more videos into two or more chunks;

applying two or more different watermarks to the two or more chunks to generate a plurality of watermarked chunk versions of a given chunk, the two or more different watermarks corresponding to different watermarking schemes, wherein a first watermarking scheme corresponds to a first algorithm and a second watermarking scheme corresponds to a second algorithm, the first algorithm and the second algorithm being different algorithms that generate different watermarked chunk versions such that a first watermarked version of the given chunk is generated by the first algorithm and a second watermarked version of the same chunk is generated by the second algorithm;

receiving a request from a respective one of the users to view a requested video, wherein the request is characterized by one or more request attributes;

generating a digital signature based at least in part on at least one of the request attributes for identifying the respective one of the users; and encoding the digital signature into a video stream corresponding to the requested video by:

selecting a sequence of watermarked chunk versions having the different watermarking schemes based at least in part on the digital signature, wherein the sequence of watermarked chunk versions of the requested video that is correlated with the digital signature identifies the respective one of the users that receives the requested video; and initiating delivery of the requested video to the respective one of the users, wherein the requested video comprises the sequence of watermarked chunk versions that identifies the respective one of the users by correlating the sequence of watermarked chunks having the different watermarking schemes to the users, where a given order of the chunk versions for disclosed content having a first chunk generated with the first algorithm and a second chunk generated by the second algorithm is matched against the digital signature selected from a plurality of digital signatures corresponding to a respective plurality of requests to access the requested video to identify the respective one of the users as a source of unauthorized disclosure for the disclosed content.

12. The computer readable medium of claim 11, further comprising instructions which, when stored in memory and executed by the one or more processors causes the one or more processors to perform acts of:

identifying a recovered video fragment;

identifying the requested video associated with the recovered video fragment;

detecting one or more of the watermarked chunk versions that comprise the recovered video fragment;

accessing the plurality of digital signatures corresponding to the respective plurality of requests to access the requested video; and correlating the one or more of the watermarked chunk versions to the plurality of digital signatures based at least in part on the sequence of watermarked chunk versions corresponding to respective binary representations of the plurality of digital signatures, where an ordering of the first and second algorithms for the watermarked chunk versions is correlated to identify the respective one of the users as a source of unauthorized disclosure for the disclosed content.

13. The computer readable medium of claim 12, wherein identifying the requested video associated with the recovered video fragment comprises acts of:
   computing a plurality of video characteristic curves of a respective plurality of candidate videos, wherein the video characteristic curves comprise a first time series of measurements of at least one video metric over time;
   computing a video characteristic curve of the recovered video fragment, wherein the video characteristic curve comprises a second time series of measurements of at least a portion of the recovered video fragment; and
   correlating the video characteristic curve of the recovered video fragment to the plurality of video characteristic curves of the candidate videos to identify the requested video.

14. The computer readable medium of claim 12, further comprising instructions which, when stored in memory and executed by the one or more processors causes the one or more processors to perform acts of computing one or more correlation scores corresponding to a respective one or more of the plurality of digital signatures, wherein the correlation scores indicate a correlation strength between the one or more of the plurality of digital signatures.

15. The computer readable medium of claim 12, further comprising instructions which, when stored in memory and executed by the one or more processors causes the one or more processors to perform acts of:
   selecting at least one selected digital signature from the plurality of digital signatures;
   extracting one or more of the request attributes from the selected digital signature; and
   identifying at least one of the users from the request attributes extracted from the selected digital signature.

16. The computer readable medium of claim 11, further comprising instructions which, when stored in memory and executed by the one or more processors causes the one or more processors to perform acts of storing in a request log comprising at least one of, the digital signature, the one or more request attributes, one or more additional characteristics pertaining to the user, or one or more requested video attributes.

17. The computer readable medium of claim 11, wherein the video sources comprise at least one of, one or more storage devices that store a pre-recorded copy of the video, or one or more live video broadcast sources that deliver at least one real time video stream.

18. The computer readable medium of claim 11, wherein the request attributes comprise at least one of, a user identifier, a session identifier, a timestamp, an IP address, an indication that a particular watermarked chunk was actually delivered to a requestor, or an indication that a particular watermarked chunk was never actually delivered to the requestor.

19. A system for forensic watermarking of video content, the system comprising:
   a storage medium having stored thereon a sequence of instructions; and
   one or more processors that execute the instructions to cause the one or more processors to perform a set of acts, the acts comprising,
      identifying at least one server, wherein the server is interfaced with one or more video sources that deliver one or more videos to one or more users;
      partitioning the one or more videos into two or more chunks;
      applying two or more different watermarks to the two or more chunks to generate a plurality of watermarked chunk versions of a given chunk, the two or more different watermarks corresponding to different watermarking schemes, wherein a first watermarking scheme corresponds to a first algorithm and a second watermarking scheme corresponds to a second algorithm, the first algorithm and the second algorithm being different algorithms that generate different watermarked chunk versions such that a first watermarked version of the given chunk is generated by the first algorithm and a second watermarked version of the same chunk is generated by the second algorithm;
      receiving a request from a respective one of the users to view a requested video, wherein the request is characterized by one or more request attributes;
      generating a digital signature based at least in part on at least one of the request attributes for identifying the respective one of the users; and
      encoding the digital signature into a video stream corresponding to the requested video by:
         selecting a sequence of watermarked chunk versions having the different watermarking schemes based at least in part on the digital signature, wherein the sequence of watermarked chunk versions of the requested video that is correlated with the digital signature identifies the respective one of the users that receives the requested video; and
      initiating delivery of the requested video to the respective one of the users, wherein the requested video comprises the sequence of watermarked chunk versions that identifies the respective one of the users by correlating the sequence of watermarked chunks having the different watermarking schemes to the users, where a given order of the chunk versions for disclosed content having a first chunk generated with the first algorithm and a second chunk generated by the second algorithm is matched against the digital signature selected from a plurality of digital signatures corresponding to a respective plurality of requests to access the requested video to identify the respective one of the users as a source of unauthorized disclosure for the disclosed content.

20. The system of claim 19, wherein the video sources comprise at least one of, one or more storage devices that store a pre-recorded copy of the video, or one or more live video broadcast sources that deliver at least one real time video stream.

21. The system for claim 19, wherein the instructions cause the one or more processors to further perform the set of acts further comprising:
   identifying a recovered video fragment;
   identifying the requested video associated with the recovered video fragment;
   detecting one or more of the watermarked chunk versions that comprise the recovered video fragment;

accessing the plurality of digital signatures corresponding to the respective plurality of requests to access the requested video; and correlating the one or more of the watermarked chunk versions to the plurality of digital signatures based at least in part on the sequence of watermarked chunk versions corresponding to respective binary representations of the plurality of digital signatures, where an ordering of the first and second algorithms for the watermarked chunk versions is correlated to identify the respective one of the users as a source of unauthorized disclosure for the disclosed content.

22. The system of claim 19, wherein the instructions cause the one or more processors to further perform evaluating a set of watermarking techniques by measuring a degree of distinguishability of a set of candidate watermarked chunk versions and selecting at least some evaluated watermarking techniques that generate candidate watermarked chunk versions that are distinguishable from other chunk versions.

* * * * *